US010258020B2

(12) United States Patent
Dixon (10) Patent No.: US 10,258,020 B2
(45) Date of Patent: Apr. 16, 2019

(54) VEHICLE ANIMAL MOTION RESTRAINT

(71) Applicant: Ryan D. Dixon, Casper, WY (US)

(72) Inventor: Ryan D. Dixon, Casper, WY (US)

( * ) Notice: Subject to any disclaimer, the term of this patent is extended or adjusted under 35 U.S.C. 154(b) by 427 days.

(21) Appl. No.: 14/294,452

(22) Filed: Jun. 3, 2014

(65) Prior Publication Data
US 2015/0342148 A1 Dec. 3, 2015

(51) Int. Cl.
*A01K 1/04* (2006.01)

(52) U.S. Cl.
CPC ....................... *A01K 1/04* (2013.01)

(58) Field of Classification Search
CPC ............... A01K 1/04; A01K 1/06; A01K 1/00
See application file for complete search history.

(56) References Cited

U.S. PATENT DOCUMENTS

| 1,951,660 | A | * | 3/1934 | Klaudt | A47H 1/022 |
| | | | | | 16/94 D |
| 2,695,052 | A | | 11/1954 | Yates et al. | |
| 2,909,154 | A | | 10/1959 | Thomas | |
| 3,395,675 | A | * | 8/1968 | Fowlkes | A01K 1/04 |
| | | | | | 119/784 |
| 4,023,819 | A | * | 5/1977 | Holman, Jr. | B60P 7/15 |
| | | | | | 254/103 |
| 4,252,084 | A | * | 2/1981 | Willow | A01K 27/003 |
| | | | | | 119/771 |
| 4,737,056 | A | * | 4/1988 | Hunt | B60P 7/15 |
| | | | | | 224/404 |
| 4,791,886 | A | * | 12/1988 | Anderson | A01K 1/04 |
| | | | | | 119/771 |
| 4,827,876 | A | * | 5/1989 | Krekelberg | A01K 1/04 |
| | | | | | 119/771 |
| 4,834,027 | A | * | 5/1989 | Meyer | A01K 1/04 |
| | | | | | 119/771 |
| 4,899,694 | A | * | 2/1990 | Belluomini | A01K 27/003 |
| | | | | | 119/771 |
| 4,947,801 | A | * | 8/1990 | Glass | A01K 1/0272 |
| | | | | | 119/771 |
| D343,032 | S | * | 1/1994 | Carrero | D30/151 |
| D360,711 | S | * | 7/1995 | O'Neill | 119/771 |

(Continued)

*Primary Examiner* — Monica L Williams
*Assistant Examiner* — Aaron M Rodziwicz
(74) *Attorney, Agent, or Firm* — Samuel M. Freund; Cochran Freund & Young LLC (57) ABSTRACT

An animal restraining or tethering device for permitting movement of an animal along paths having their extent defined by a telescoping elevated rod adapted to be mounted between opposing passenger grab handles in a vehicle or between opposing mounting locations in a truck bed, is described. One end of a component rod member and one end of a tube member are fitted with adjustable end connectors for reversible attachment of the rod assembled therefrom to the passenger grab handles or the truck bed attachment locations. At least one sliding member adapted to slidably move along the rod is attached to a leash or chain which is in turn connected to an animal collar or harness. The sliding member can also be fixed at a chosen location along the rod, if desired. Various rings and loops may be fastened to the rod at chosen locations for holding items placed in the vehicle, and for preventing these items from being thrown about as a result of vehicle movement.

24 Claims, 6 Drawing Sheets

(56) References Cited

U.S. PATENT DOCUMENTS

| | | | | |
|---|---|---|---|---|
| 5,551,379 | A | * | 9/1996 | Hart ................. A01K 27/003 |
| | | | | 119/771 |
| D379,688 | S | * | 6/1997 | Werner .................... D30/151 |
| 5,718,190 | A | * | 2/1998 | Tinker ............... A01K 1/0272 |
| | | | | 119/771 |
| D424,254 | S | | 5/2000 | Rooney |
| 6,079,369 | A | * | 6/2000 | Hill .................. A01K 27/003 |
| | | | | 119/771 |
| 6,260,513 | B1 | | 7/2001 | Younkin |
| 6,374,776 | B2 | | 4/2002 | Adair et al. |
| D569,050 | S | * | 5/2008 | Spater ..................... D30/151 |
| 7,845,312 | B2 | | 12/2010 | Brown |
| 8,607,741 | B2 | * | 12/2013 | Perry ...................... A01K 1/04 |
| | | | | 119/756 |
| 8,936,292 | B2 | * | 1/2015 | Latiolais, Jr. .......... E21B 19/12 |
| | | | | 138/96 T |
| 2003/0221635 | A1 | * | 12/2003 | Fradette, II ......... A01K 27/003 |
| | | | | 119/784 |
| 2006/0054109 | A1 | | 4/2006 | Smith |
| 2007/0006819 | A1 | * | 1/2007 | Gilbert-Brindley ..... A01K 1/04 |
| | | | | 119/771 |
| 2011/0067648 | A1 | | 3/2011 | Siklosi et al. |
| 2015/0096502 | A1 | * | 4/2015 | Weston ................... A01K 1/04 |
| | | | | 119/785 |

* cited by examiner

VEHICLE ANIMAL MOTION RESTRAINT

FIELD OF THE INVENTION

The present invention relates generally to animal restraining devices and, more particularly, to an animal restraining or tethering device for permitting movement of an animal along paths having their extent defined by an elevated rod adapted to be mounted between passenger grab handles in a vehicle or between mounting locations in a truck bed.

BACKGROUND OF THE INVENTION

Existing vehicle animal restraining devices define the motion of the animal using wires or cables affixed to passenger grab handles in a vehicle or between mounting locations in a truck bed. Although it is possible to tension such wires or cables, such that they are straight and somewhat rigid, a strong animal is capable of pulling such wires away from linearity, thereby permitting the animal to move forward or rearward of the seat bench upon which the animal is placed, or forward or rearward of the wire or cable location in the truck bed.

Additionally, it is difficult to reliably fix the motion along such wires using a clamp without crimping or pinching, or otherwise damaging the wires. Moving the location of clamp further damages the cable, such that free movement along the cable using a sliding device becomes impaired.

SUMMARY OF THE INVENTION

Embodiments of the present invention overcome the disadvantages and limitations of the prior art by providing an apparatus for restraining an animal to motion along an adjustable portion of a defined linear path with controlled deviations therefrom.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, an embodiment of the vehicle animal motion restraint, hereof, includes: a rod having an outer surface comprising: a rod member having a chosen cross section and a chosen length, a first end and a second end; a hollow tube member having a chosen inner cross section, a first end and a second end adapted to slidably receive the first end of the rod member into the first end thereof, and an outer surface, thereby forming the rod; a first end connector attached to the second end of the rod member and adapted to reversibly attach to a first vehicle passenger grab handle; and a second end connector attached to the second end of the tube member and adapted to reversibly attach to a second vehicle passenger grab handle opposite the first grab handle; a leash having a chosen length, a first end and a second end; and at least one slide member adapted to slidably move on the outer surface of the rod, the at least one slide member including: a band surrounding at least a portion of the outer surface of the rod which passes therethrough, and having an inner surface; and a connector attached to the band for affixing the first end of said leash.

In another aspect of the present invention and in accordance with its objects and purposes, an embodiment of the vehicle animal motion restraint, hereof, includes: a rod having an outer surface including: a rod member having a chosen cross section and a chosen length, a first end and a second end; a hollow tube member having a chosen inner cross section, a first end and a second end adapted to slidably receive the first end of the rod member into the first end thereof, thereby forming the rod; a first end connector attached to the second end of the rod member and adapted to reversibly attach to a first truck bed mounting location; and a second end connector attached to the second end of the tube member and adapted to reversibly attach to a second truck bed mounting location opposite the first mounting location; a leash having a chosen length, a first end and a second end; and at least one slide member adapted to slidably move on the outer surface of the rod, the at least one slide member including: a band surrounding at least a portion of the outer surface of the rod which passes therethrough, and an inner surface; and a connector attached to the band for affixing the first end of the leash.

Benefits and advantages of embodiments of the present invention include, but are not limited to, providing a device for restraining animal motion in a vehicle to an adjustable portion of a linear path with controlled departures therefrom.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 3A is a schematic representation of a ring mounted to the rod shown in FIG. 1, hereof, for attaching items thereto such that the items are restrained from unwanted displacement during motion of the vehicle, while

DETAILED DESCRIPTION OF THE INVENTION

Briefly, embodiments of the present invention include an animal restraining or tethering device for permitting movement of an animal along paths having their extent defined by a telescoping elevated rod adapted to be mounted between opposing passenger grab handles in a vehicle or between opposing mounting locations in a truck bed. The rod may have a circular, elliptical, square or rectangular cross section, as examples, the component tube member and the rod member having similar cross sections to permit the members to telescope, thereby forming a rod having a length adaptable to the spacing between passenger grab handles or between attachment locations of a pickup truck bed. The rod member may be solid or hollow, depending on the anticipated loading, and the materials of manufacture. For example, the rod member and the tube member may be made from plastic or metal. One end of the rod member and one end of the tube member are fitted with adjustable end connectors for reversible attachment of the rod assembled therefrom to the passenger grab handles or the truck bed attachment locations. At least one sliding member adapted to slidably move along the rod is attached to a leash, which may comprise a chain or strap, as examples, which is in turn connected to an animal collar or harness. The sliding member can also be fixed at a chosen location along the rod, if desired. Various rings and loops may be fastened to the rod at chosen locations for holding items placed in the vehicle, and preventing these items from being thrown about as a result of vehicle movement.

Figure 1:
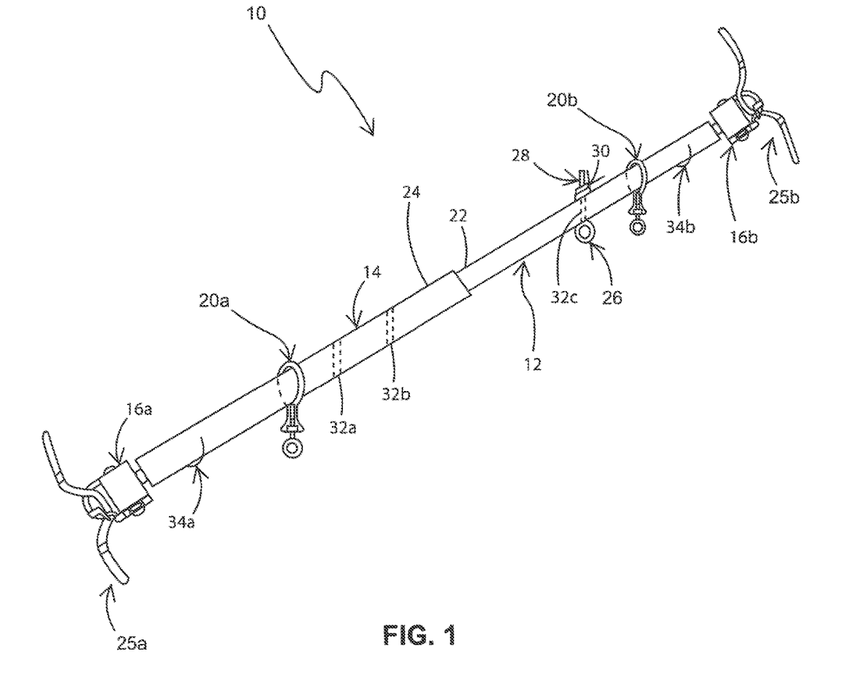
FIG. 1 is a schematic representation of a perspective view of an embodiment of the vehicle animal restraint of the present invention, illustrating the rod member and tube member, with accompanying end connectors, forming a rod over which at least one slide is adapted to slidably move.

Reference will now be made in detail to the present embodiments of the invention, examples of which are illustrated in the accompanying drawings. In the FIGURES, similar or identical structures will be identified using identical reference characters. It will be understood that the FIGURES are presented for the purpose of describing particular embodiments of the invention and are not intended to limit the invention thereto. Turning now to FIG. 1, shown is a schematic representation of a perspective view of an embodiment of the vehicle animal restraint, 10, of the present invention, illustrating the rod member, 12, and tube member, 14, with accompanying end connectors, 16a, and, 16b, forming rod, 18, over which at least one slide member, shown as, 20a, and, 20b, are adapted to slidably move. Slide members 20 and connectors 16 will be described in more detail hereinbelow. As stated hereinabove, rod member 12 may be hollow or solid depending on its material of manufacture, intended loading and length, and rod member 12 and tube member 14 may have one of several cross sections, such as circular, oval, rectangular, or square, as examples. Rod member 12 and tube member 14 may be fabricated from plastic or metal, as examples. End, 22, of rod member 12 is adapted to fit into end, 24, of tube member 14 in a telescoping manner, such that rod 18 has an adjustable length, determined by the attachment of end connectors 16 to the automobile grab handles, 25a, and, 25b, or truck bed attachment locations.

At least one ring, 26, may be fastened to rod member 12 and/or tube member 14 using threaded members, 28 and locked nuts, 30, as examples, through holes, 32a-32c, as examples, drilled or otherwise formed therein. Holes 32 may also be used to adjust the range of the at least one slide member 20, for example, by selecting holes on both sides of the desired range of travel, and placing a stop, such as a screw, through each hole, held therein by a nut (not shown in FIG. 1). Bails, 34a, and, 34b, as examples, may also be mounted to rod member 12 and tube member 14. Rings 26 and bails 34 may be used to hold items such as grocery bags and clothes hangers in place during vehicle motion, as well as for providing stops for restricting the motion of the at least one slide member 20.

Figure 2A:
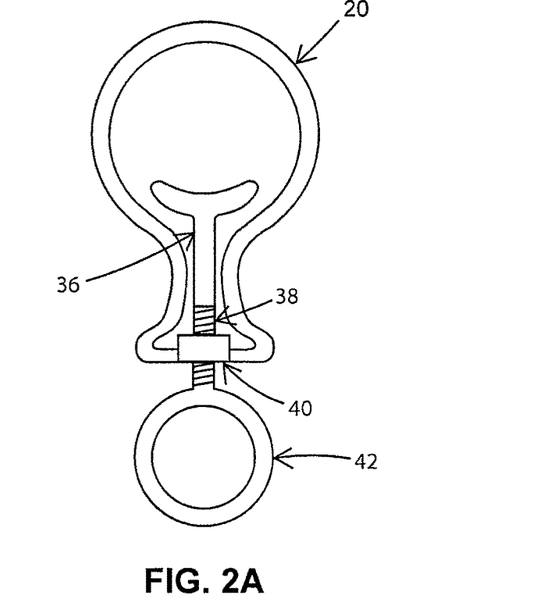
FIG. 2A is a schematic representation of a side view of an embodiment of a slide member adapted to slide on the rod shown in FIG. 1, hereof, having an adjustable clamping member.

FIG. 2A is a schematic representation of a side view of an embodiment of slide member 20 adapted to slide on the rod 18 shown in FIG. 1, hereof, having swiveling adjustable clamping member, 36, for adjusting the tension between rod 18 and slide member 20. Threaded member, 38, screwed into threaded block, 40, mounted on slide 20, may be rotated by ring, 42.

Figure 2B:
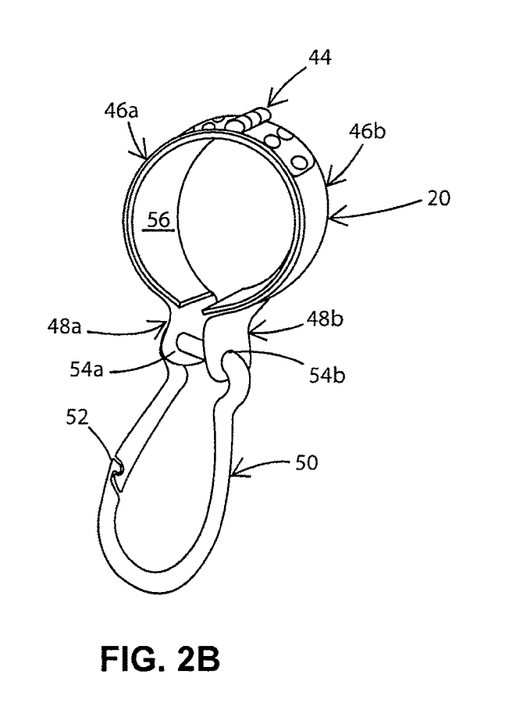
FIG. 2B is a schematic representation of a perspective view of a hinged slide adapted to slidably move along the rod shown in FIG. 1, hereof, and to be fitted onto the rod without disassembly thereof from its attachment to the vehicle, and having a clasp for attaching items.

FIG. 2B is a schematic representation of a perspective view of another embodiment of slide 20 adapted to slidably move along rod 18, having hinge member, 44, attached to slide member body portions, 46a, and, 46b, such that slide member 20 can be opened at end portions, 48a, and, 48b, and fitted onto rod 18 without disassembly thereof from its attachment to the vehicle. Shown in FIG. 2B are clasp, 50, having latch, 52, for attaching items and securing end portions 48a and 48b by means of holes, 54a, and, 54b, in end portions 48a and 48b, and insert, 56. Insert 56 provides smoother motion of slide member 20 on rod 18, and may be made of plastic or rubber, as examples.

Figure 2C:
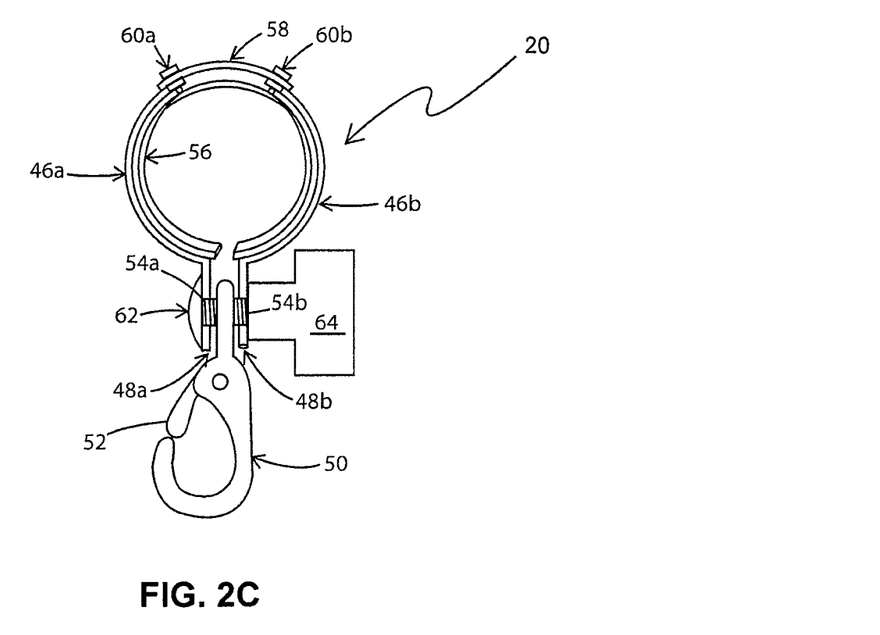
FIG. 2C is a schematic representation of a side view of another embodiment of the hinged slide shown in FIG. 2B, hereof, illustrating a tightening screw for adjusting the sliding drag and a rubber or plastic insert for improving sliding on the rod.

FIG. 2C is a schematic representation of a side view of another embodiment of slide 20 shown in FIG. 2B, hereof, having a different hinge mechanism, 58, therefrom. Hinge 58 may include flexible plastic or rubber sheet fastened to body portions 46a and 46b by fasteners, 60a and 60b. Threaded member, 62, in cooperation with tightening knob, 64, both adjusts the sliding drag of slide 20 by controlling the distance between end portions 48a and 48b, and provides a support for latching member 50, effective for holding items such that the items are restrained from unwanted displacement during motion of the vehicle. Rubber or plastic insert 56 improves the sliding of slide member 20 on rod 18.

Figure 3A:
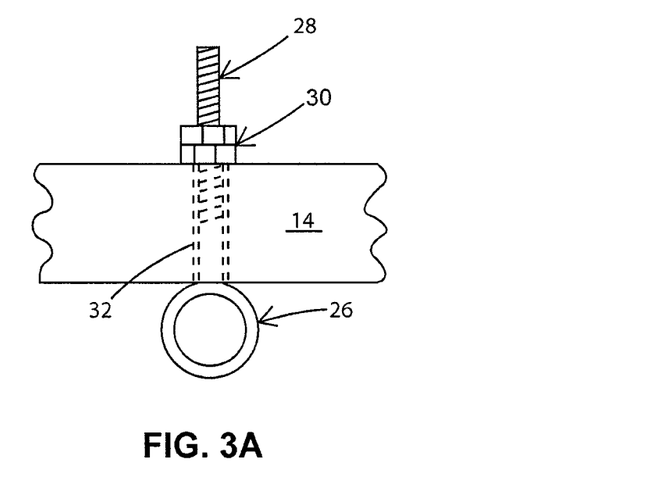
Figure 3B:
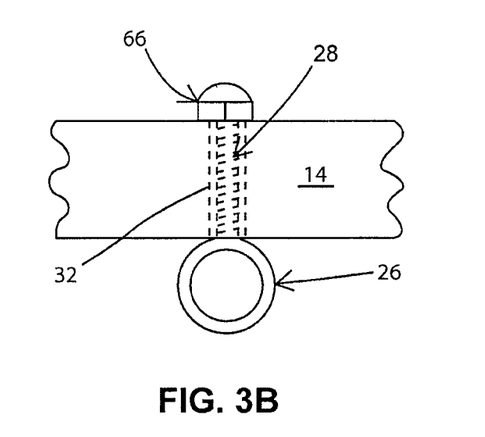
FIG. 3B is another embodiment thereof.

FIG. 3A is a schematic representation the side view of ring 26 mounted to rod 18 through holes 32 therein, using threaded member 28 and locking nuts 30, for attaching items thereto such that the items are restrained from unwanted displacement during motion of the vehicle. FIG. 3B is a schematic representation of the side view of another embodiment of ring 26 illustrating cap nut, 66, for fastening threaded member 28 in hole 32.

Figure 4A:
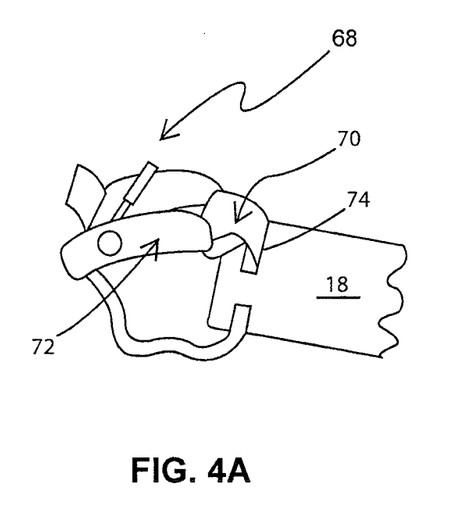
FIG. 4A is a schematic representation of a perspective view of an embodiment of an end connector for the rod illustrated in FIG. 1, hereof, where an adjustable strap is attached directly to the rod member and/or the tube member of the rod.
Figure 4B:
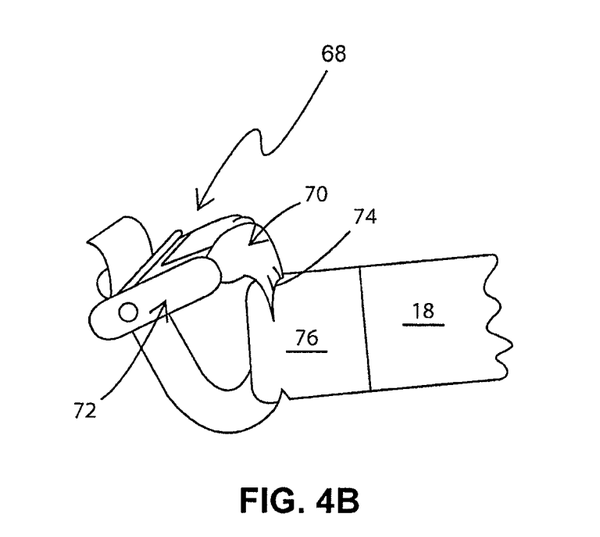
FIG. 4B is a schematic representation of a perspective view of an embodiment of an end connector for the rod shown in FIG. 1, hereof, illustrating the adjustable strap being connected to an end cap, which may be rotatable, attached to the rod member and/or the tube member.

FIG. 4A is a schematic representation of a perspective view of an embodiment of end connector, 68, for either or both of the free ends of rod member 12 and tube member 14, where adjustable strap, 70, having adjusting buckle, 72, is directly attached to either end of rod 18 through slot, 74. FIG. 4B is a schematic representation of another embodiment of end connector 68 shown in FIG. 4B, illustrating adjustable strap 70 connected to end cap, 76, which may be a swivel connector or joint, through slot 74, where end cap 76 is attached to one end of rod 18. Strap 70 may comprise plastic or fabric, as examples.

Figure 4C:
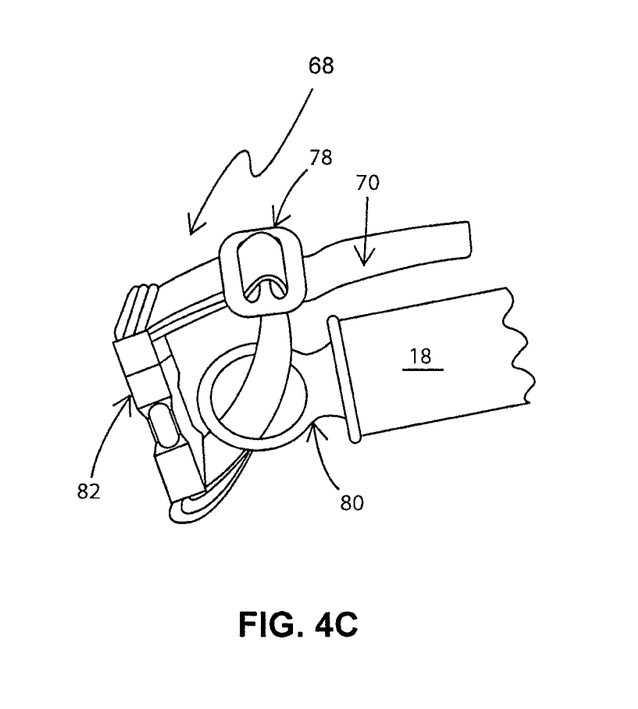
FIG. 4C is a schematic representation of a perspective view of an embodiment of an end connector illustrating an adjustable strap connected to a ring member attached to the end of the rod member and/or the tube member, each adjustable strap having a quick disconnect for attaching and removing the end connector from its attachment location.
Figure 4D:
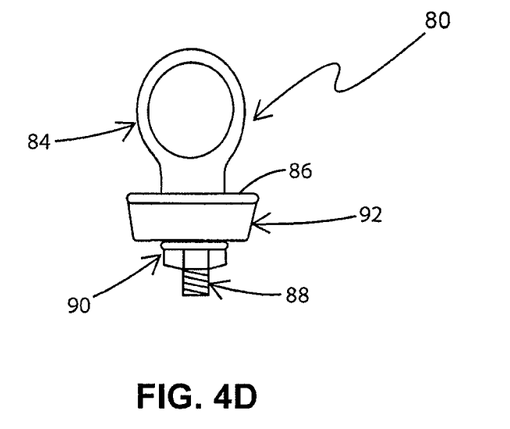
FIG. 4D is a schematic representation of a perspective view of the parts of the ring member shown in FIG. 4C, hereof, which expand when the ring is rotated, thereby affixing the ring member to one or both of the free ends of the rod member and the tube member.

FIG. 4C is a schematic representation of another embodiment of end connector 68, illustrating adjustable strap 70 having buckle, 78, connected to ring member, 80, attached to the ends of rod 18, adjustable strap 70 further having quick disconnect member, 82, for securing the open ends thereof effective for attaching and removing end connector 68 from its point of attachment. FIG. 4D is a schematic representation of a perspective view of ring member 80, illustrating ring, 84, having base member, 86, and attached to threaded rod, 88, onto which nut, 90, is threaded. When ring member 80 is inserted into an end of rod 18 and ring 84 is turned, nut 90 presses expandable member, 92, against base member 86, thereby expanding base member 86 and affixing the ring member 80 to the end of rod 18.

Figure 4E:
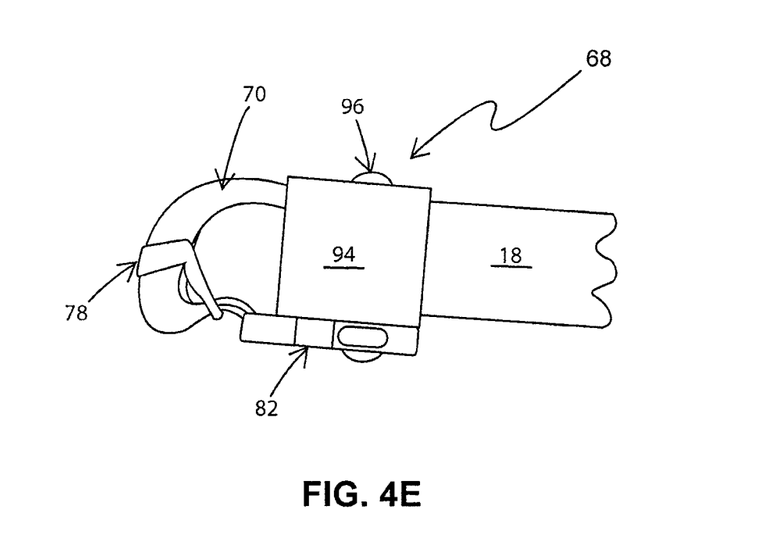
FIG. 4E is a schematic representation of a perspective view of an end connector having an adjustable strap with a quick-disconnect attached to a block affixed to the end of the rod member and/or the tube member.

FIG. 4E is a schematic representation of another embodiment of end connector 68 having adjustable strap 70 with quick-disconnect member 82 attached to block, 94, affixed to the end of rod 18 by fastener, 96.

It should be mentioned that end connectors 68 may be different at each end of rod 18 depending on the intended use thereof, and that end connectors 68 permit reversible attachment of rod 18 to the passenger grab handles of a vehicle or to attachment locations of a truck bed. Further, although the leash is not shown in the FIGURES, any such device known in the art may be attached at one end to slide members 20 and to an animal harness or collar at the other end for confining the animal to the chosen paths and range.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A vehicle animal motion restraint, comprising:
    a telescoping rod having an outer surface comprising:
        a rod member having a chosen cross section and a chosen length, a first end and a second end;
        a hollow tube member having a chosen inner cross section, a first end and a second end adapted to slidably receive the first end of said rod member into the first end thereof, thereby forming said telescoping rod having a continuously adjustable length;
        a first end connector attached to the second end of said rod member and adapted to reversibly attach to a first vehicle passenger grab handle; and
        a second end connector attached to the second end of said tube member and adapted to reversibly attach to a second vehicle passenger grab handle opposite the first grab handle;
    a leash having a chosen length, a first end and a second end; and
    at least one slide member adapted to slidably move on the outer surface of said telescoping rod, said at least one slide member comprising:
        a band surrounding at least a portion of the outer surface of said telescoping rod which passes therethrough, and an inner surface; and
        a connector attached to said band for affixing the first end of said leash.

2. The animal motion restraint of claim 1, wherein said at least one slide member further comprises an insert disposed on at least a portion of the inner surface of said band for reducing friction between said band and said telescoping rod.

3. The animal motion restraint of claim 2, wherein said insert comprises materials chosen from plastic and rubber.

4. The animal motion restraint of claim 1, wherein said band further comprises:
    a first end and a second end with an open portion therebetween; and
    means for adjusting the size of the open portion;
    whereby the friction between said band and said telescoping rod is adjusted.

5. The animal motion restraint of claim 4, wherein said means for adjusting the size of the open portion comprises screw means.

6. The animal motion restraint of claim 1, wherein said band further comprises a hinge member.

7. The animal motion restraint of claim 1, wherein the second end of said leash is connected to an animal harness or an animal collar.

8. The animal restraint of claim 1, further comprising at least two, spaced-apart stops disposed on said telescoping rod, whereby said slide member is confined to slide on said telescoping rod between two of said at least two stops.

9. The animal motion restraint of claim 8, wherein at least one of said at least two stops is adapted to hold at least one item.

10. The animal motion restraint of claim 1, wherein said first end connector and said second end connector comprise adjustable straps.

11. The animal motion restraint of claim 10, wherein each of said adjustable straps comprise a latching clip.

12. The animal motion restraint of claim 1, wherein said first end connector is attached to the second end of said rod member by a swivel joint, and said second end connector is attached to the second end of said tube member by a swivel joint.

13. A vehicle animal motion restraint, comprising:
    a telescoping rod having an outer surface comprising:
        a rod member having a chosen cross section and a chosen length, a first end and a second end;
        a hollow tube member having a chosen inner cross section, a first end and a second end adapted to slidably receive the first end of said rod member into the first end thereof, thereby forming said telescoping rod having a continuously adjustable length;
        a first end connector attached to the second end of said rod member; and
        a second end connector attached to the second end of said tube member;
    a leash having a chosen length, a first end and a second end; and
    at least one slide member adapted to slidably move on the outer surface of said telescoping rod, said slide member comprising:
        a band surrounding at least a portion of the outer surface of said telescoping rod which passes therethrough, and an inner surface; and
        a connector attached to said band for affixing the first end of said leash.

14. The animal motion restraint of claim 13, wherein said at least one slide member further comprises an insert disposed on at least a portion of the inner surface of said band for reducing friction between said band and said telescoping rod.

15. The animal motion restraint of claim 14, wherein said insert comprises materials chosen from plastic and rubber.

16. The animal motion restraint of claim 13, wherein said band further comprises:
   a first end and a second and with an open portion therebetween; and
   means for adjusting the size of the open portion;
   whereby the friction between said band and said telescoping rod is adjusted.

17. The animal motion restraint of claim 16, wherein said means for adjusting the size of the open portion comprises screw means.

18. The animal motion restraint of claim 13, wherein said band further comprises a hinge member.

19. The animal motion restraint of claim 13, wherein the second end of said leash is connected to an animal harness or to an animal collar.

20. The animal motion restraint of claim 13, further comprising at least two, spaced-apart stops disposed on said telescoping rod, whereby said slide member is confined to slide on said telescoping rod between two of said at least two stops.

21. The animal motion restraint of claim 20, wherein at least one of said at least two stops is adapted to hold at least one item.

22. The animal motion restraint of claim 13, wherein said first end connector and said second end connector comprise adjustable straps.

23. The animal motion restraint of claim 22, wherein each of said adjustable straps comprises a latching clip.

24. The animal motion restraint of claim 13, wherein said first end connector is attached to the second end of said rod member by a swivel joint and said second end connector is attached to the second end of said tube member by a swivel joint.

* * * * *